US009447998B2

(12) United States Patent (10) Patent No.: US 9,447,998 B2
McMasters et al. (45) Date of Patent: Sep. 20, 2016

(54) METHOD AND APPARATUS FOR IMPROVING THE CHARGE ACCURACY OF A REFRIGERANT RECOVERY UNIT

(71) Applicant: Service Solutions U.S. LLC, Warren, MI (US)

(72) Inventors: Mark McMasters, Owatonna, MN (US); Dylan Lundberg, Lonsdale, MN (US); William Brown, Owatonna, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 238 days.

(21) Appl. No.: 13/797,132

(22) Filed: Mar. 12, 2013

(65) Prior Publication Data

US 2014/0260351 A1 Sep. 18, 2014

(51) Int. Cl.
*F25B 45/00* (2006.01)
*B60H 1/00* (2006.01)

(52) U.S. Cl.
CPC ........... *F25B 45/00* (2013.01); *B60H 1/00585* (2013.01); *F25B 2345/001* (2013.01); *F25B 2345/003* (2013.01); *F25B 2345/006* (2013.01); *F25B 2345/007* (2013.01)

(58) Field of Classification Search
CPC .............. F25B 45/00; F25B 2345/006; F25B 2345/007; B60H 1/00585
See application file for complete search history.

(56) References Cited

U.S. PATENT DOCUMENTS

| 6,185,945 B1 | 2/2001 | Pfefferle et al. |
| 2006/0230775 A1* | 10/2006 | Govekar ......................... 62/292 |
| 2011/0160918 A1 | 6/2011 | McMasters et al. |
| 2012/0291457 A1 | 11/2012 | Brown et al. |
| 2013/0047635 A1 | 2/2013 | Shultz et al. |

FOREIGN PATENT DOCUMENTS

KR 101214755 B1 1/2013

OTHER PUBLICATIONS

International Search Report dated Aug. 6, 2014 for PCT/US2014/024967; filed Mar. 12, 2014.

* cited by examiner

*Primary Examiner* — Ryan J Walters
*Assistant Examiner* — Christopher R Zerphey
(74) *Attorney, Agent, or Firm* — Baker Hostetler LLP

(57) ABSTRACT

A refrigerant recovery unit with improved charging accuracy is provided. In some embodiments, the contamination of charging refrigerant can be prevented while also providing greater refrigerant flow control. In addition, methods associated therewith for servicing refrigerant containing refrigeration systems are provided. In some aspects, the methods include steps that can be used to achieve more accurate assessments of the refrigerant that is charged into the refrigeration systems during servicing.

29 Claims, 5 Drawing Sheets

METHOD AND APPARATUS FOR IMPROVING THE CHARGE ACCURACY OF A REFRIGERANT RECOVERY UNIT

FIELD OF THE DISCLOSURE

The disclosure generally relates to a refrigerant recovery unit and associated methods for charging refrigerant into refrigeration systems. More particularly, the apparatus and methods used to improve the charge accuracy of the refrigerant recovery unit.

BACKGROUND OF THE DISCLOSURE

Refrigeration systems are currently commonplace in commercial and residential buildings, and a variety of vehicles including, for example, automobiles, aircrafts, watercrafts, and trains. Over time, the refrigerant included in refrigeration systems is depleted and/or contaminated. As such, in order to maintain the overall efficiency and efficacy of a refrigeration system, the refrigerant included therein may be periodically replaced or recharged.

Refrigerant recovery units or carts are used in connection with the service and maintenance of refrigeration systems, such as air conditioning (A/C) systems. The refrigerant recovery unit connects to the A/C system to recover refrigerant out of the system and separate out oil and contaminants from the refrigerant in order to recharge or replace refrigerant into the A/C system.

Currently available processes for replacing the refrigerant contained in air conditioning systems typically include, evacuating the refrigerant contained in an A/C system, either, charging refrigerant evacuated or transferring new refrigerant into a refrigerant recovery unit storage tank, and transferring the refrigerant from the refrigerant recovery unit into the A/C system. In order to estimate how much refrigerant has been transferred to the A/C system, the refrigerant recovery unit typically includes a refrigerant container that is weighed before and after some refrigerant has been transferred into the A/C system.

The ability to obtain accurate weight measurements to get an accurate assessment of how much refrigerant entered the A/C system is important to provide proper servicing. Inaccurate weight measurements result in inaccurate assessments of how much refrigerant actually entered the A/C system during the charge, which can result in undercharging or overcharging the A/C system causing it to underperform.

As a consequence of the foregoing, a need exists for a refrigerant recovery unit and methods associated therewith that can improve the charge accuracy of a refrigerant recovery unit.

SUMMARY OF THE DISCLOSURE

Accordingly, the foregoing needs are met, to a great extent, by the present disclosure, wherein in one aspect, a refrigerant recovery unit can purge vapor refrigerant from the service hoses before taking a reference weight measurement. Lack of vapor in the service hoses provides for the ability to obtain more precise measurements of the amount of refrigerant that is actually transferred into the refrigeration system.

According to aspects of the disclosure, in some embodiments, a refrigerant recovery unit, the unit including a charging circuit configured to charge a refrigerant into a refrigerant system. The charging circuit which includes one or more service hoses, a refrigerant container in fluid communication with the charging circuit, a scale capable of measuring a weight of the refrigerant container, and a recirculating circuit configured to recirculate the refrigerant from a connection on or in close proximity to a coupler located at the system interface end of the one or more service hoses to a component capable of purging vapor refrigerant so that the refrigerant contained in the one or more service hoses is all or substantially all liquid refrigerant.

In additional embodiments, the refrigerant recovery unit can include a recirculating circuit connected to or in proximity to coupler located at a system interface end of one or more service hoses and a charging circuit in fluid connection to the one or more service hoses. The recirculating circuit and the charging circuit can include separate valves on or in proximity to said coupler located at the system interface end of the one or more service hoses.

In additional aspects of the disclosure, a method of improving refrigerant charge accuracy using a refrigerant recovery unit is described. The method including recirculating refrigerant through a recirculating circuit connected to or in proximity to a coupler located at a system interface end of one or more service hoses, removing vapor refrigerant to increase the amount of liquid refrigerant contained in the one or more service hoses using the recirculating circuit, measuring, with a scale, an initial reference weight of a refrigerant container after vapor refrigerant has been removed, transferring refrigerant to a refrigerant system, and measuring, with the scale, a second weight of the refrigerant container to ensure a recommended amount of refrigerant has been transferred to the refrigerant system.

There has thus been outlined, rather broadly, certain aspects of the disclosure in order that the detailed description herein may be better understood, and in order that the present contribution to the art may be better appreciated.

In this respect, before explaining at least one embodiment of the disclosure in detail, it is to be understood that the disclosure is not limited in its application to the details of the construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION OF THE DISCLOSURE

Figure 1:
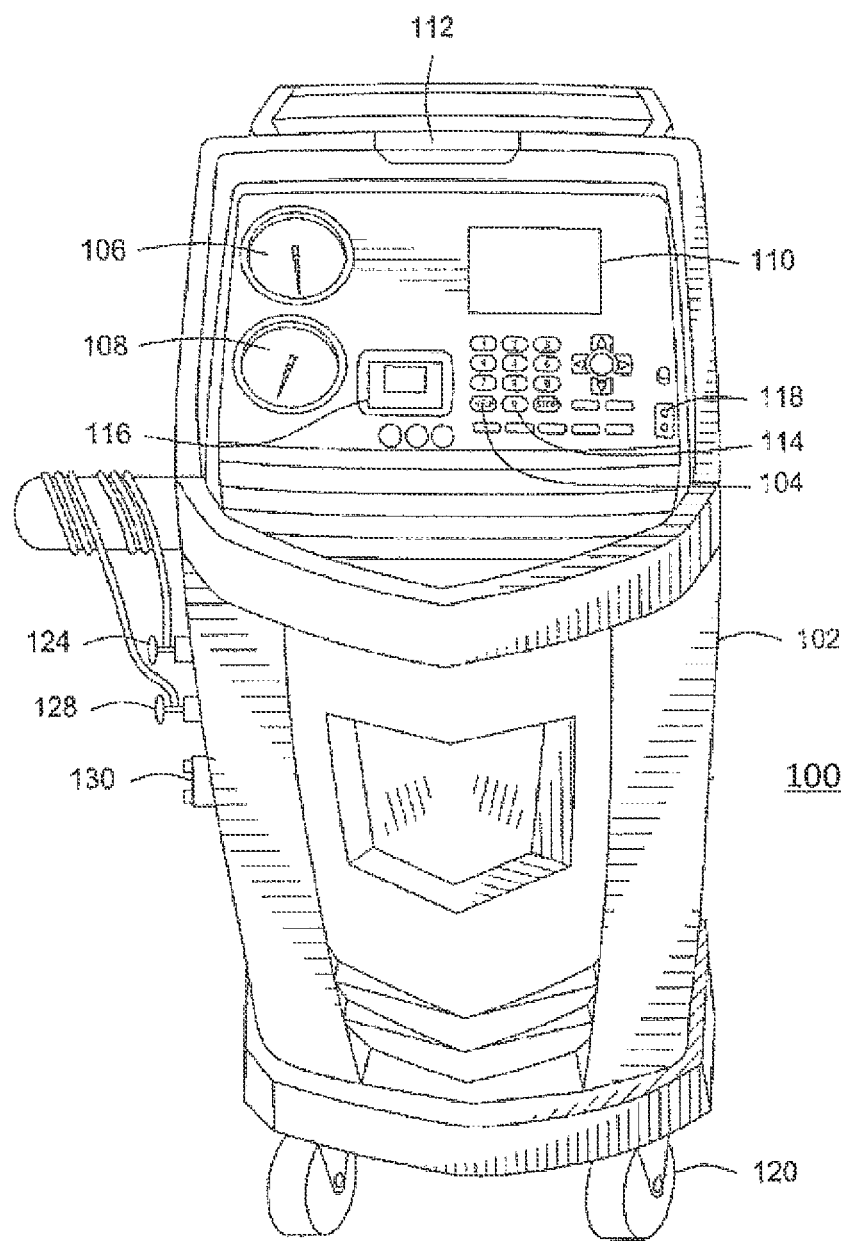
FIG. 1 is a front view of an exemplary refrigerant recovery unit according to aspects of the disclosure.

Refrigerant recovery units or carts are used in connection with the service and maintenance of refrigeration systems. The refrigerant recovery unit connects to the refrigerant system to recover refrigerant out of the system, separate out oil and contaminants from the refrigerant in order to recycle the refrigerant, and recharge the refrigerant system.

According to aspects of the present disclosure, a refrigerant recovery unit that can be configured to more accurately transfer refrigerant to refrigeration systems, including for example, A/C systems found in residential and commercial buildings, and a variety of vehicles including, automobiles, aircrafts, watercrafts, and trains, is provided. The refrigerant recovery unit can recover, recharge and/or replace an amount of depleted and/or contaminated refrigerant with increased accuracy thereby maintaining the overall efficiency and efficacy of the refrigerant system.

In some embodiments of the present disclosure, a refrigerant flow path conduit connected from the coupler containing ends of the service hoses and back to the oil separator is included. The refrigerant flow path conduit can be controlled, for example, by one or more solenoid valve(s). In some refrigerant recovery units, the refrigerant flow path conduit may be a refrigerant conduit portion of a circuit used for the recovery process, or a separate charging refrigerant flow path conduit that leads into the oil separator. The solenoid valve(s) can be capable of opening the flow path inside the conduit to thereby create a loop system that passes through the oil separator, purging vapor refrigerant in the lines, and back into the storage tank to fill the service hoses with a greater volume of liquid refrigerant.

In some embodiments according to aspects of the disclosure, in said recovery units where the charging flow path conduit and the recovery flow path conduit leading towards the oil separator are separate, the diameter of the charge flow path conduit can be reduced. By reducing the diameter of the charge flow path, improved control of the refrigerant results, and additionally, the charge path can be kept from left over contamination resulting from recovered refrigerant remaining in the flow path conduit.

The disclosure will now be described with reference to the drawing figures. Throughout the description, the disclosure will now be described with reference to the drawings figures in which like reference numerals can refer to like parts throughout.

Beginning with FIG. 1, a front view of an exemplary refrigerant recovery unit 100 in accordance with some aspects of the disclosure is depicted. The refrigerant recovery unit 100 can include, for example, unit model number AC1234™ from Robinair™ based in Owatonna, Minn. (Service Solutions U.S. LLC). The refrigerant recovery unit 100 includes a cabinet 102 to house components of the unit. The cabinet 102 may be made of any material such as thermoplastic, steel and the like.

The cabinet 102 includes a control panel 104 that allows the user to operate the refrigerant recovery unit 100. The control panel 104 may be part of the cabinet 102 as shown in FIG. 1 or separated. The control panel 104 includes high and low gauges 106, 108, respectively. The gauges may be analog or digital as desired by the user. The control panel 104 has a display 110 to provide information to the user, such as certain operating status of the refrigerant recovery unit 100 or provide messages or menus to the user. Located near the display 110 can be LEDs 112 to indicate to the user the operational status of the refrigerant recovery unit 100. The LEDs 112 may indicate that the refrigerant recovery unit 100 is in the recovery, recycling or recharging mode, or indicate that the filter (not shown) needs to be changed, that there is a malfunction, or other indicators.

A user interface 114 is also included on the control panel 104. The user interface 114 allows the user to interact and operate the refrigerant recovery unit 100 and can include an alphanumeric keypad and directional arrows. A power switch 118 or emergency shut off control can be included as part of the user interface 114. A printer 116 is provided to print out information, such as test results.

Figure 2:
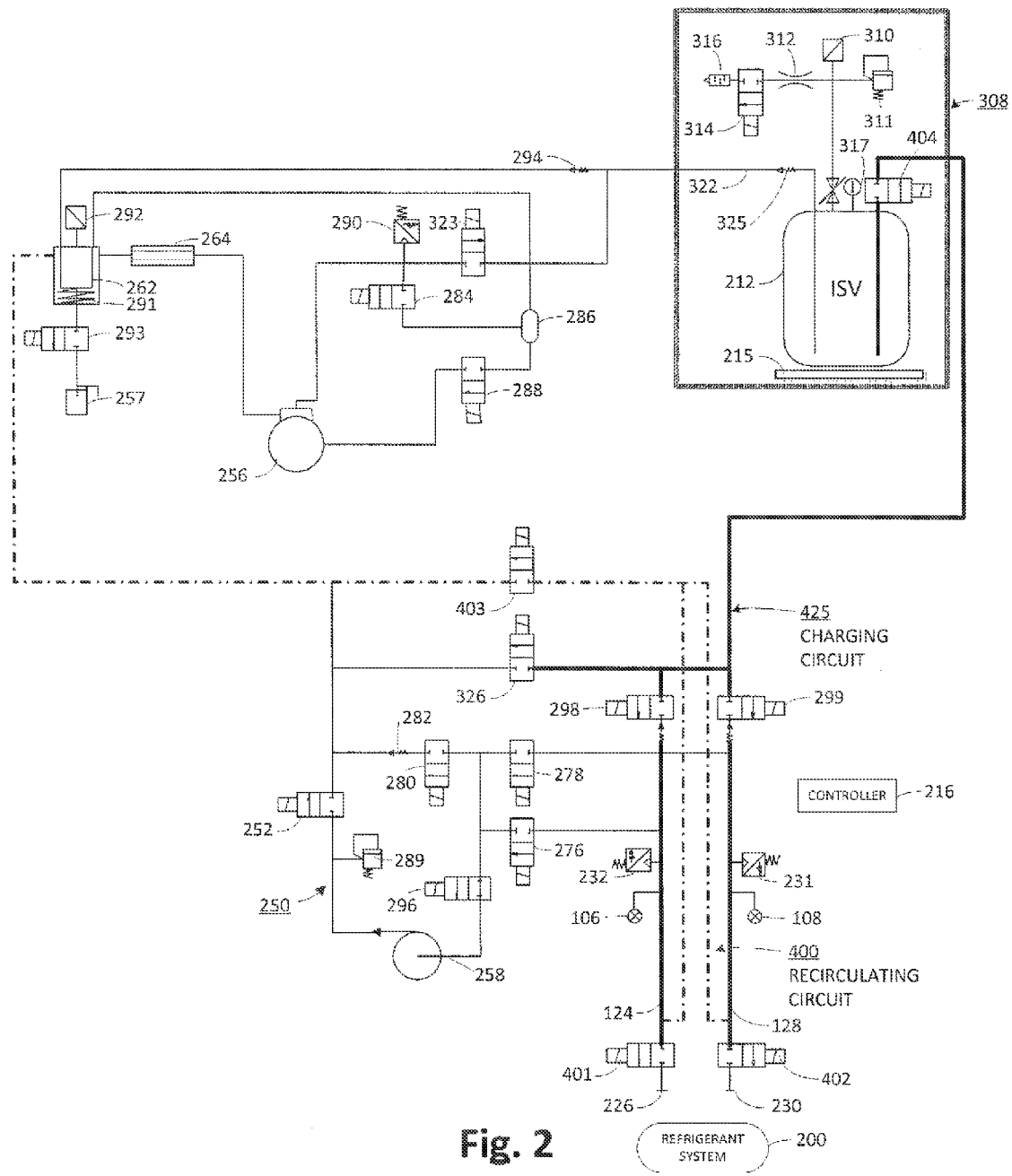
FIG. 2 illustrates exemplary components of the refrigerant recovery unit of FIG. 1 according to aspects of the disclosure.

The cabinet 102 further includes connections for hoses 124, 128 that connect the refrigerant recovery unit 100 to a refrigerant containing device, such as a refrigerant system 200 (shown in FIG. 2). Also shown in FIG. 1, a connector interface 130 is provided so that a communication cable can be connected from the connector interface 130 to a data link connector included in some A/C systems. This can allow the refrigerant recovery unit 100 to communicate with an A/C system's controller (not shown) and diagnose any issues with it. In order for the refrigerant recovery unit 100 to be mobile, wheels 120 are provided at a bottom portion of the system.

Figure 3:
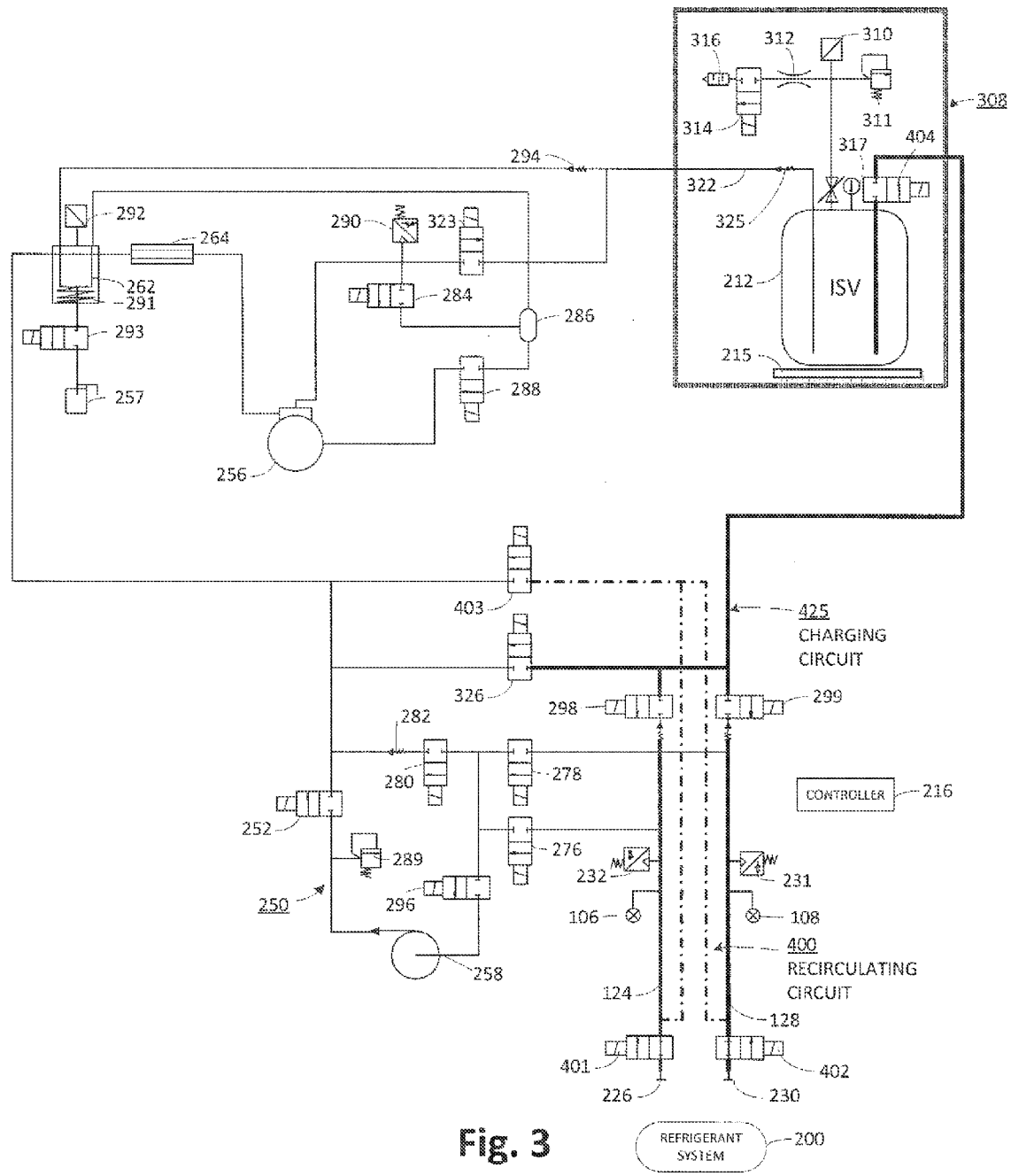
FIG. 3 illustrates exemplary components of the refrigerant recovery unit of FIG. 1 according to aspects of the disclosure.
Figure 4:
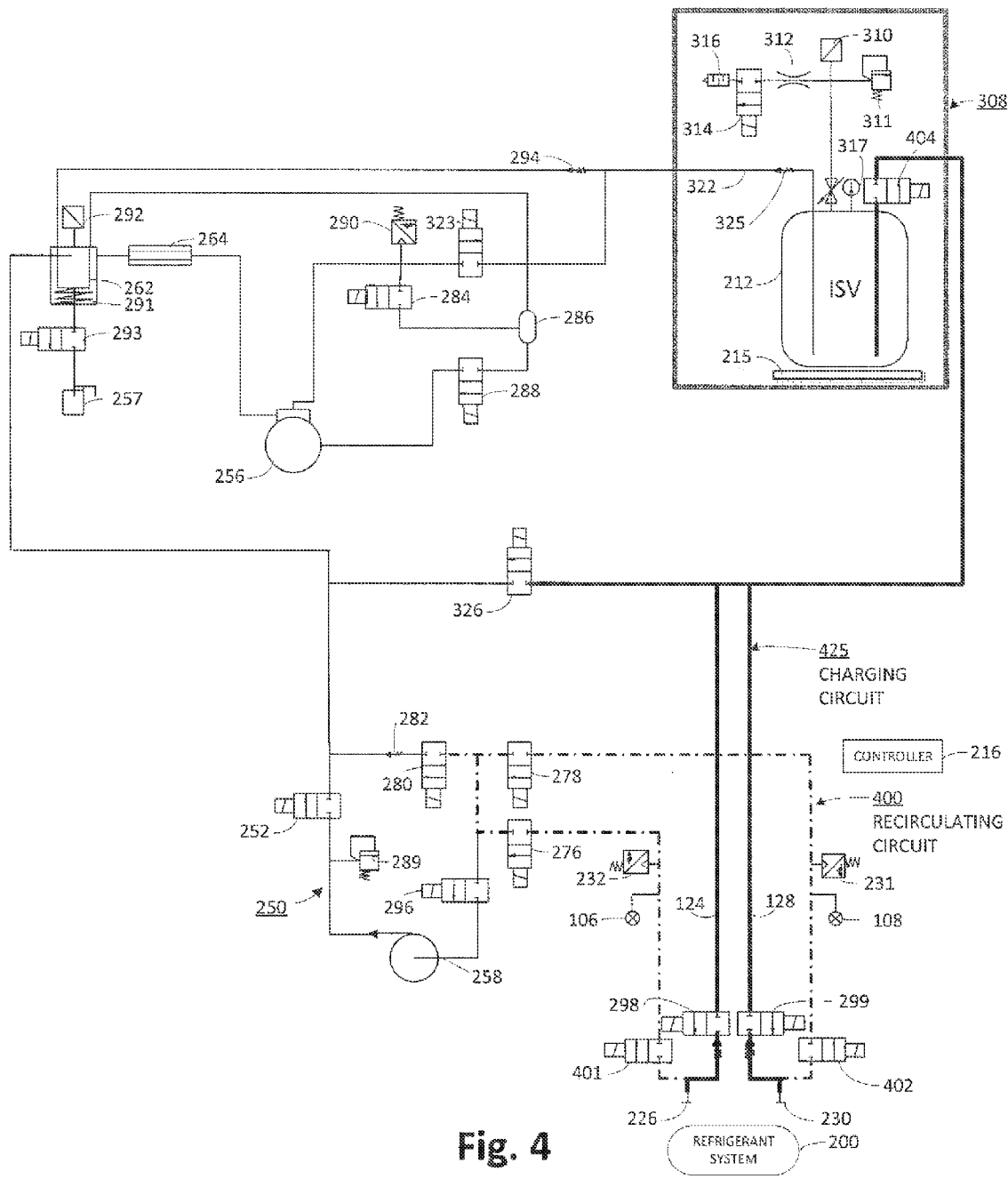
FIG. 4 illustrates exemplary components of another refrigerant recovery unit according to aspects of the disclosure.

Referring now to FIGS. 2-4, some components included within and/or that may be included in refrigerant recovery units are depicted in flow diagrams according to the present disclosure. In the following section, general functionality of recovery units and components are described.

In some embodiments, to service the A/C system, the service hoses 124, 128 can be coupled to the refrigerant system 200, via couplers 226 (high side) and 230 (low side), respectively. The couplers 226, 230 can be designed to be closed until they are coupled to the refrigerant system 200.

Recovery Cycle

The recovery cycle can be initiated by the opening of high pressure and low-pressure solenoids 276, 278, respectively. This allows the refrigerant within the refrigerant system 200 to flow through a recovery valve 280 and a check valve 282. The refrigerant flows from the check valve 282 into a system oil separator 262, where it travels through a filter/dryer 264, to an input of a compressor 256. Refrigerant is drawn through the compressor 256 through a normal discharge solenoid 284 and through a compressor oil separator 286, which circulates oil back to the compressor 256 through an oil return valve 288. The refrigerant recovery unit 100 may include a high-pressure switch 290 in communication with a controller 216, which can be programmed to determine an upper pressure limit, for example, 435 psi, to optionally shut down the compressor 256 to protect the compressor 256 from excessive pressure.

The controller 216 can also be, for example, a microprocessor, a field programmable gate array (FPGA) or application-specific integrated circuit (ASIC). The controller 216 via a wired or wireless connection (not shown) controls the various valves and other components (e.g. vacuum pump 258, compressor 256) of the refrigerant recovery unit 100. In some embodiments of the present disclosure, any or all of the electronic solenoid or electrically activated valves may be connected and controlled by the controller 216.

A high-side clear solenoid 323 may optionally be coupled to the output of the compressor 256 to release the recovered refrigerant transferred from the compressor 256 to a path leading into a storage tank 212, instead of through a path through the normal discharge solenoid 284.

A deep recovery valve 252 is provided to assist in the deep recovery of refrigerant. When the refrigerant from the refrigerant system 200 has, for the most part, entered into the refrigerant recovery unit 100, the remaining refrigerant may be extracted from the refrigerant system 200 through a deep recovery circuit 250 by opening the deep recovery valve 252 and turning on the vacuum pump 258. Additionally, a pressure relief 289 can be included to shut off the vacuum pump 258 when pressure in the deep recovery circuit 250 increases above a pre-determined level.

The heated compressed refrigerant can exit the system oil separator 262 and travel through a loop of conduit or heat exchanger 291 for cooling or condensing. As the heated refrigerant flows through the heat exchanger 291, the heated refrigerant gives off heat to the cold refrigerant in the system oil separator 262, and assists in maintaining the temperature in the system oil separator 262 within a working range. Coupled to the system oil separator 262 can be a switch or transducer 292, such as a low pressure switch or pressure transducer, for example, that senses pressure information, and provides an output signal to the controller 216 through a suitable interface circuit programmed to detect when the pressure of the recovered refrigerant is down to 13 inches of mercury, for example. An oil separator drain valve 293 can drain the recovered oil into a container 257. Finally, the recovered refrigerant can flow through a normal discharge check valve 294 along a refrigerant circuit 322 and, in some embodiments, through a vapor check valve 325 into the storage tank 212.

Evacuation Cycle

The evacuation cycle can begin by the opening of the high pressure and low-pressure solenoids 276, and 278 and a valve 296, leading to the input of a vacuum pump 258. Prior to opening the valve 296, an air intake valve (not shown) is opened, allowing the vacuum pump 258 to start exhausting air. The refrigerant of the refrigerant system 200 can then be evacuated by the closing of the air intake valve (not shown) and opening the valve 296, allowing the vacuum pump 258 to exhaust any trace gases remaining until the pressure is approximately 29 inches of mercury, for example. When this occurs, as detected by pressure transducers 231, 232, optionally, coupled to the high side 226 and low side 230 of the refrigerant system 200 and to the controller 216, the controller 216 may turn off the valve 296 allowing for the charging cycle to begin.

In embodiments where at least a portion of the recovery path conduit is shared with the flow path conduit leading to the oil separator for the charging process, as depicted in FIGS. 2 and 3, hose fill valves 401, 402 can remain open during the evacuation process. In other embodiments where there are separate paths for the evacuation and charging, as depicted in FIG. 4, the hose fill valves 298, 299 will preferably remain closed during the evacuation cycle to prevent oil contamination in the charging path.

Air Purging

An air purging apparatus 308 is also illustrated. The air purging apparatus 308 allows the refrigerant recovery unit 100 to be purged of non-condensable, such as air. Air purged from the refrigerant recovery unit 100 may exit the storage tank 212, through an orifice 312, through a purging valve 314 and through an air diffuser 316. In some embodiments, the orifice 312 may be about 0.028 of an inch. A pressure transducer 310 can be used to measure the pressure contained within the storage tank 212 and the air purging apparatus 308 accordingly. For example, the pressure transducer 310 may send the pressure information to the controller 216, and when the pressure is too high, as calculated by the controller 216, purging is required. In addition or alternatively, a high pressure relief 311 may be included to shut off the system when pressure increases above a pre-determined level.

The purging valve 314 may be selectively actuated to permit or not permit the air purging apparatus 308 to be open to the ambient conditions. A temperature sensor 317 may be coupled to the storage tank 212 to measure the refrigerant temperature therein. The placement of the temperature sensor 317 may be anywhere on the storage tank 212 or alternatively, the temperature sensor 317 may be placed within the refrigerant circuit 322. The measured temperature and pressure may be used to calculate the ideal vapor pressure for the type of refrigerant used in the refrigerant recovery unit 100. The ideal vapor pressure can be used to determine when the non-condensable gases need to be purged and how much purging will be done in order for the refrigerant recovery unit 100 to function properly.

Charging Cycle

Figure 5:
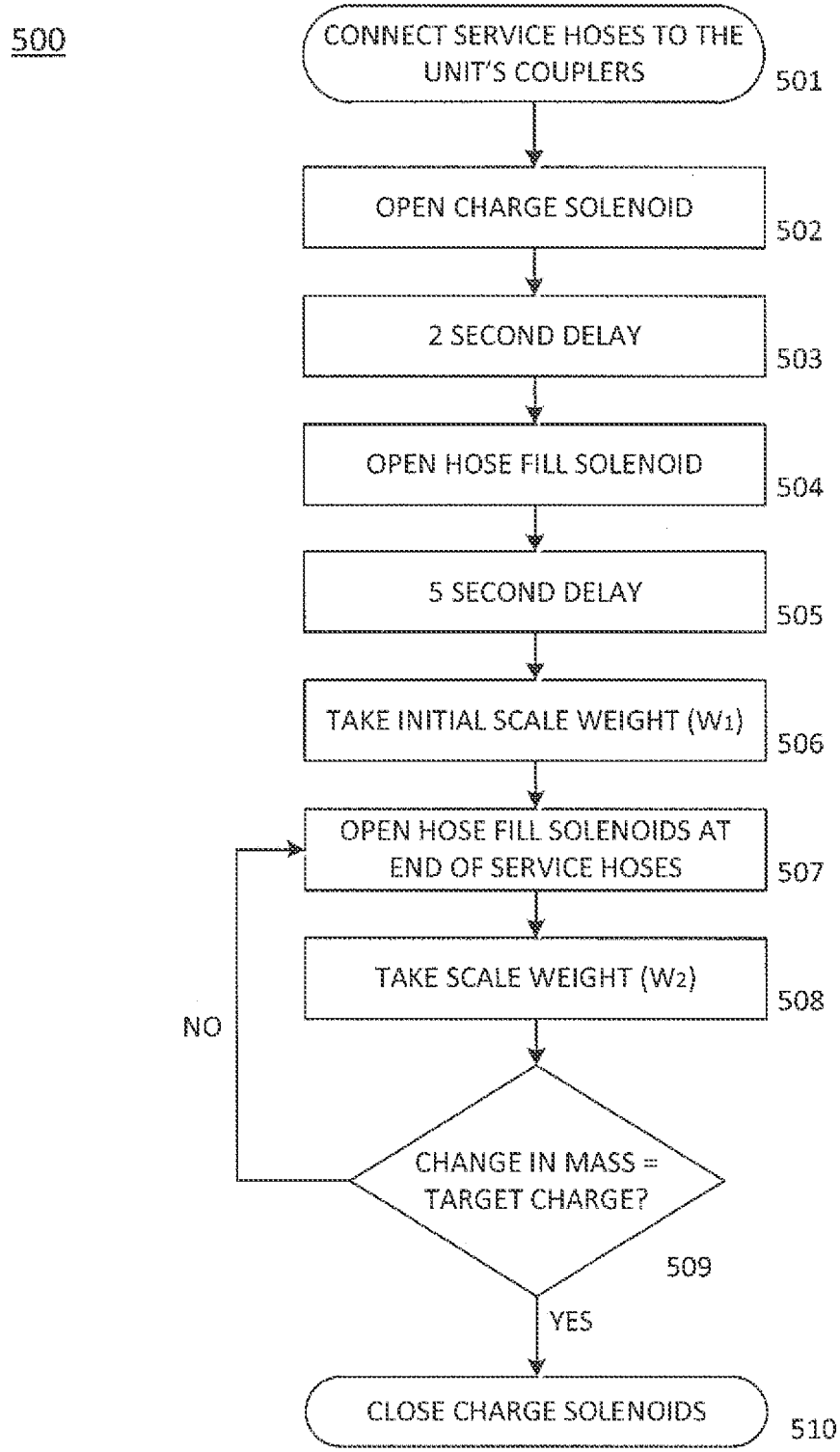
FIG. 5 illustrates a flow chart to achieve increased accuracy of the amount of refrigerant used to recharge/charge an A/C system according to aspects of the disclosure.

For purposes of clarity and in accordance to aspects of the disclosure, the charging cycle is explained in reference to method steps 500 of FIG. 5 and flow diagrams illustrated in FIGS. 2-3. In particular, the method steps 500 can be used to charge the refrigerant system 200 with increased accuracy. At step 501, the service hoses 124, 128 can be coupled to the refrigerant system 200, via the couplers 226 (high side) and 230 (low side), respectively. In some embodiments, as depicted in the flow diagram of FIG. 2, at step 502 of FIG. 5, the charging cycle can begin, for example subsequent to the evacuation cycle, by opening valve 404 to allow the refrigerant in the storage tank 212, which is at a pressure of approximately 70 psi or above, to flow through open high side charge valve 298 and fill the service hose up to the hose fill valve 401. In addition, at step 502, optionally low side charge valve 299 can also be opened to fill the low side service hose up to hose fill valve 402.

In another embodiment, in order to charge the refrigerant system 200, the power charge valve 326 may be opened and a tank fill structure (not shown) may be used. Alternatively or in addition to, the tank fill structure (not shown) may also be used to fill the refrigerant storage tank 212.

At step 503, at time delay function can take place to allow one or both of the service hoses 124, 128 to fill up with refrigerant. The time delay function may be, for example, about a 2 second time delay function to allow refrigerant to flow into the service hoses 124, 128 and a portion of the a fill recirculating circuit 400 leading up to a recirculating valve 403. Other time delays can include 1, 3, 4, 5, . . . etc., seconds delays as predetermined, or in some embodiments, adjusted based on measured sensor data. At step 504, subsequent to filling one or both of the service hoses 124, 128 and the portion of the hose fill recirculating circuit 400 leading up to a recirculating valve 403 with refrigerant, the recirculating valve 403 is opened to recirculate refrigerant from the coupler ends of the high end service hose 124 and the low end service hose 128 to the system oil separator 262, which in some embodiments can preferably be in a vacuum, to allow removing vapor refrigerant contained in the service hoses 124, 128, as shown in the charging circuit 425 in FIG. 2.

At step 505, a second time delay function can keep the recirculating valve 403 open during the time delay thereby allowing the removal of vapor refrigerant to take place. The second time delay function can be, for example, about a 5 second time delay function during which a significant amount of vapor refrigerant originally contained in the service hoses 124, 128 is replaced with recirculated condensed refrigerant. Other time delays can include 4, 6, 7, . . . etc., seconds delays as it may be predetermined or in some embodiments adjusted based on sensor data. Removal of vapor refrigerant is desired since the ratio between vapor refrigerant and liquid refrigerant contained prior to the recirculating can vary based in factors such as ambient temperature. In some embodiments, the amount of liquid refrigerant contained in both service hoses 124, 128 can account, for example, anywhere from about 183.00 grams when it is mostly liquid refrigerant to about 6.00 grams when it is mostly vapor refrigerant. Consequently, it is important to know the actual weight of the refrigerant contained in the service hoses 124, 128 and compensate for it in the reference weight of a refrigerant container, or to eliminate the variable, to improve charge accuracy of the refrigerant recovery unit 100.

The recirculating circuit 400 may be a flexible hose or any other suitable conduit for providing fluid communication, and forming a flow path loop between the end of one or both the coupler 226 end of the high end service hose 124 and the coupler 230 end of the low end service hose 128 to a part of the system capable of removing vapor refrigerant, such as the system oil separator 262. Generally, the recirculating circuit 400 can be a parallel refrigerant conduit for each, or both, service hoses 124, 128, connected near or at the hose couplers 226, 230. In some embodiments, the parallel refrigerant conduit(s) may be contained in a conduit hose material enclosing. This may be advantageous, for example, to prevent entanglement of the parallel lines. Valves may be electronically activated solenoid valves controlled by the controller 216. The connections may be a wireless or wired connections. In other embodiments the valves may be manually activated valves that can be actuated by a user.

Subsequent to the second time delay and as depicted in FIG. 3 the recirculating valve 403 is closed. Following, at step 506, an initial scale weight $W_1$ can be taken by scale 215. $W_1$ can be a reference weight of the storage tank 212 when the charging path and up to the service hoses 124, 128 are filled with liquid refrigerant up to hose fill valves 401, 402. At step 507, in some embodiments, the hose fill valves 401, 402 can be opened to allow the charging of refrigerant to the refrigerant system 200 via the couplers 226 (high side) and 230 (low side), respectively, as shown in the charging circuit 425 in FIG. 3.

At step 508, at least a second weight measurement $W_2$ by scale 215 to determine if the change in mass from $W_2-W_1$ is equal to the target weight of step 509 of the refrigerant required for proper service of the refrigerant system 200. The target weight 509 can be, for example, the refrigerant weight as provided by the system's specifications. When the target change in weight is less than desired, more refrigerant can be added to the system and another weight can be taken until the target change is met. Once the proper amount of refrigerant has been added to the refrigeration system, at step 510, the charge and hose fill solenoids can be closed to complete the charging.

Referring now to FIG. 4, another exemplary alternative embodiment according to aspects of the disclosure is depicted. In particular, the exemplary embodiment includes different flow path conduits for the charging circuit 425 and for the hose fill recirculation circuit 400. In some embodiments, a t-fitting near the couplers 223, 230, or alternatively that is part of the couplers, can be used to split the hose fill recirculating circuit 400 and the charging circuit 425. This can allow for a common connection to the refrigerant system 200 but yet minimizing the sharing of the fluid paths. In a similar manner, however, the parallel refrigerant conduit(s) may be contained in a single conduit hose material enclosing. This may be advantageous, for example, to prevent entanglement of the parallel lines.

By keeping different flow path conduits, the service hoses 124, 128 can remain full of liquid refrigerant to significantly improve the charging accuracy of the refrigerant recovery unit 100. In the same manner described, however, the method steps 500 can be performed in this type of refrigerant recovery unit 100 for calibration when refrigerant is first added and/or every so often depending on the type of refrigerant system 200 being serviced. In addition, the diameter of the charging flow path 425 can be reduced thereby reducing refrigerant amount variation and improving flow consistency. Further, contamination of the refrigerant being charged is prevented since any remaining matter in the recovery circuit 275 is significantly decreased due to the limited shared fluid path.

In some embodiments, aspects of the refrigerant recovery unit 100 may be implemented via the controller 216 forming part of a control system (not shown) that is capable of implementing software or a combination of software and hardware. Control system may be integrated with the controller 216 to permit, for example, automation of the recovery, evacuation, and recharging processes and/or manual control over one or more of each of the processes individually. In one embodiment, the control system can allow the refrigerant recovery unit 100 to communicate and diagnose the refrigeration system being serviced.

In another embodiment, the control system can allow for communication with a diagnostic tool, such as a VCI, that is coupled to the refrigeration system under service. This allows the refrigerant recovery unit 100 to receive data which could include Heating, Ventilation and Air Conditioning ("HVAC") systems sensor readings, related diagnostic trouble codes, system pressures, and interactive tests, like actuating of various components, such as a fan control. All of this data and information would be displayed on the display 110 of the refrigerant recovery unit 100. Menu selections, diagnostic trouble codes, and interactive tests may be displayed and certain diagnostic may be performed using the refrigerant recovery unit 100.

The control system may include a processor connected to a communication infrastructure (e.g., a communications bus, cross-over bar, or network). The various software and hardware features described herein are described in terms of an exemplary control system. A person skilled in the relevant art(s) will realize that other computer related systems and/or architectures may be used to implement the aspects of the disclosed disclosure.

It is to be understood that any feature described in relation to any one aspect may be used alone, or in combination with other features described, and may also be used in combination with one or more features of any other of the disclosed aspects, or any combination of any other of the disclosed aspects.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A refrigerant recovery unit, the unit comprising:
   first and second service hoses configured to charge a refrigerant into a refrigerant system, wherein the first and second service hoses each having a hose fill valve at an end;
   a refrigerant container storing the refrigerant, said refrigerant container being in fluid communication with the first and second service hoses;
   a scale for measuring a weight of the refrigerant container;
   first and second recirculating hoses configured to recirculate the refrigerant contained in the first and second service hoses from a connection at each of the hose fill valves to a component configured to purge vapor refrigerant so that the refrigerant contained in the first and second service hoses is liquid refrigerant before the refrigerant is charged into the refrigerant system; and
   a controller configured to open a charge solenoid and activate a first time delay function of 1, 2, 3, 4, or 5 seconds such that the refrigerant from the refrigerant container fills the first and second service hoses up to the hose fill valves and the first and second recirculating hoses up to a recirculating valve;
   wherein the recirculating valve is configured to allow the refrigerant from the first and second recirculating hoses to reach the component; and
   wherein the controller is further configured to, after the first time delay, open the recirculating valve such that vapor refrigerant is purged from the first and second service hoses via the first and second recirculating hoses.

2. The refrigerant recovery unit of claim 1, wherein the first and second service hoses and the first and second recirculating hoses share a refrigerant flow path conduit portion.

3. The refrigerant recovery unit of claim 1, wherein the first and second service hoses and the first and second recirculating hoses have separate parallel flow path conduits portions.

4. The refrigerant recovery unit of claim 1, wherein diameters of the first and second service hoses are relatively smaller than diameters of the first and second recirculating hoses to increase charge accuracy of the refrigerant recovery unit.

5. The refrigerant recovery unit of claim 1, wherein the first and second recirculating hoses are in fluid connection with a flow path conduit leading into an oil separator of the refrigerant recovery unit, the oil separator is the component capable of purging vapor refrigerant.

6. The refrigerant recovery unit of claim 1, wherein the first and second recirculating hoses are in fluid connection with a flow path conduit leading into the refrigerant container of the refrigerant recovery unit.

7. The refrigerant recovery unit of claim 1, further comprising a control system in logical communication a diagnostic tool that communicates with the refrigeration system, the control system configured to receive a diagnostic trouble code.

8. The refrigerant recovery unit of claim 1, wherein the controller is further configured to activate a second time delay function to keep the recirculating valve when opened to remain open in order to remove vapor refrigerant from the first and second service hoses.

9. The refrigerant recovery unit of claim 1, wherein the controller is further configured to activate a second time delay function of 4 or 5 seconds to allow the recirculating valve to remain open to allow removal of vapor refrigerant from the first and second service hoses.

10. The refrigerant recovery unit of claim 9, wherein the controller after the second time delay is further configured to take, with the scale, a first measurement of the refrigerant container and a second measurement of the refrigerant container after charging the refrigerant system with refrigerant.

11. The refrigerant recovery unit of claim 1, further comprising a connector interface configured to receive a cable connected to a data link connector of the refrigerant system to diagnose the refrigerant system.

12. The refrigerant recovery unit of claim 1, wherein the first time delay function is 2 seconds.

13. The refrigerant recovery unit of claim 1, wherein the first time delay function is 3 seconds.

14. The refrigerant recovery unit of claim 1, wherein the first time delay function is 4 seconds.

15. The refrigerant recovery unit of claim 1, wherein the first time delay function is 5 seconds.

16. A refrigerant recovery unit, the unit comprising:
   first and second service hoses each connected to a hose fill valve;
   first and second recirculating hoses in fluid connection with the first and second service hoses, wherein the first and second recirculating hoses are configured to recirculate a refrigerant contained in the first and second service hoses to a component configured to purge vapor refrigerant so that the refrigerant contained in the first and second service hoses is liquid refrigerant before the refrigerant is charged into a refrigerant system;
   a scale for measuring refrigerant in a refrigerant tank;
   a control system configured to communicate with a diagnostic tool that communicates with the refrigeration system, the control system further configured to receive a diagnostic trouble code; and
   a controller configured to open a charge solenoid and activate a first time delay function of 1, 2, 3, 4, or 5 seconds such that the refrigerant from refrigerant container fills the first and second service hoses up to the hose fill valves and the first and second recirculating hoses up to a recirculating valve;
   wherein the recirculating valve is configured to allow the refrigerant from the first and second recirculating hoses to reach the component; and
   wherein the controller is further configured to, after the first time delay, open the recirculating valve such that the vapor refrigerant is purged from the first and second service hoses via the first and second recirculating hoses.

17. The refrigerant recovery unit of claim 16, wherein diameters of the first and second service hoses are relatively smaller than diameters of the first and second recirculating hoses to increase charge accuracy of the refrigerant recovery unit.

18. The refrigerant recovery unit of claim 16, wherein the controller is further configured to activate a second time delay function to keep the recirculating valve when opened to remain open in order to remove vapor refrigerant from the first and second service hoses.

19. The refrigerant recovery unit of claim 9, wherein the first time delay function is 2 second and the second time delay function is 5 seconds.

20. The refrigerant recovery unit of claim 16, wherein the controller is further configured to activate a second time delay function of 4 or 5 seconds to allow the recirculating valve to remain open to allow removal of vapor refrigerant from the first and second service hoses.

21. The refrigerant recovery unit of claim 20, wherein the first time delay function is 2 seconds and the second time delay function is 5 seconds.

22. The refrigerant recovery unit of claim 20, wherein the controller after the second time delay is further configured to take, with the scale, a first measurement of the refrigerant tank and a second measurement of the refrigerant tank after charging the refrigerant system with refrigerant.

23. The refrigerant recovery unit of claim 16, further comprising a connector interface configured to receive a cable connected to a data link connector of the refrigerant system to diagnose the refrigerant system.

24. The refrigerant recovery unit of claim 16, wherein the first time delay function is 2 seconds.

25. The refrigerant recovery unit of claim 16, wherein the first time delay function is 3 seconds.

26. The refrigerant recovery unit of claim 16, wherein the first time delay function is 4 seconds.

27. The refrigerant recovery unit of claim 16, wherein the first time delay function is 5 seconds.

28. A method to improve charge accuracy of a refrigerant recovery unit, comprising the steps of:

charging first and second service hoses with a refrigerant from a refrigerant tank;

activating a first time delay function of 1, 2, 3, 4, or 5 seconds, via a controller, such that the refrigerant from the refrigerant tank fills the first and second service hoses and first and second recirculating hoses up to a recirculating valve;

opening the recirculating valve, after the first delay function, by the controller to remove vapor refrigerant from the first and second service hoses;

activating a second time delay function of 4, 5, 6, or 7 seconds, via the controller, such that the recirculating valve remains open, during the second time delay function, further removing vapor refrigerant from the first and second service hoses resulting in liquid refrigerant;

closing the recirculating valve with the controller; and charging a refrigerant system with said liquid refrigerant from the first and second service hoses.

29. The method of claim 28, further comprising the steps of:

taking, with a scale, a first measurement of the refrigerant tank before the charging step; and taking, with the scale, a second measurement after charging the refrigerant system with refrigerant to determine whether a target weight of refrigerant has been transferred during the charging step.

* * * * *